United States Patent
Best et al.

(10) Patent No.: US 8,810,086 B2
(45) Date of Patent: Aug. 19, 2014

(54) ROTOR FOR AN ELECTRIC EXTERNAL ROTOR MOTOR AND EXTERNAL ROTOR MOTOR

(75) Inventors: Dieter Best, Ingelfingen (DE); Werner Müller, Mulfingen-Seidelklingen (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 371 days.

(21) Appl. No.: 13/228,694

(22) Filed: Sep. 9, 2011

(65) Prior Publication Data

US 2012/0062052 A1 Mar. 15, 2012

(30) Foreign Application Priority Data

Sep. 9, 2010 (EP) .................................... 10175897

(51) Int. Cl.
*H02K 5/10* (2006.01)
*H02K 5/18* (2006.01)
*H02K 9/22* (2006.01)
*H02K 1/27* (2006.01)

(52) U.S. Cl.
CPC ............... *H02K 9/22* (2013.01); *H02K 1/2786* (2013.01); *H02K 5/10* (2013.01); *H02K 5/18* (2013.01)
USPC ............................ 310/64; 415/176; 417/423.8

(58) Field of Classification Search
USPC ..................... 415/176; 417/423.8; 310/64, 89
See application file for complete search history.

(56) References Cited

U.S. PATENT DOCUMENTS

| 2,458,010 | A |   | 1/1949 | Ludwig |
|---|---|---|---|---|
| 3,226,580 | A | * | 12/1965 | Oehlrich et al. ................. 310/57 |
| 4,431,931 | A | * | 2/1984 | Perrier et al. .................... 310/61 |
| 5,783,881 | A | * | 7/1998 | Best et al. .................... 310/68 C |
| 5,944,497 | A | * | 8/1999 | Kershaw et al. ............ 417/423.8 |
| 6,204,583 | B1 | * | 3/2001 | Sasaki et al. ..................... 310/91 |
| 7,507,068 | B2 | * | 3/2009 | Lin et al. ........................ 415/176 |
| 2006/0145567 | A1 | * | 7/2006 | Lee ................................ 310/261 |
| 2010/0126703 | A1 | * | 5/2010 | Ruan et al. ............... 165/104.33 |

FOREIGN PATENT DOCUMENTS

| DE | 296 12 395 U1 | 1/1998 |
|---|---|---|
| EP | 0 749 197 A2 | 12/1996 |
| EP | 1 419 568 B1 | 5/2005 |
| WO | WO 2004/013944 A1 | 2/2004 |

OTHER PUBLICATIONS

International Search Report—Jan. 18, 2011.

* cited by examiner

*Primary Examiner* — Tran Nguyen
(74) *Attorney, Agent, or Firm* — Brinks Gilson & Lione

(57) ABSTRACT

Disclosed is a rotor (1) for an electric rotor motor, consisting of a rotor bell (2) with a peripheral wall (4) and at least one one-sided rotor base (6) to enclose a stator, in particular as a part of a motor housing with a high IP rating, for example IP54 per DIN/IEC-EN 60034-5. The rotor bell (2) features a heat sink (12) with high heat conductivity that extends through the rotor base (6) in such a way that the motor heat arising on the inside can be removed via the heat sink (12) through the rotor base (6) to the outside into the environment. Further, the invention relates to an electric rotor motor, in particular with an encapsulated motor housing with a high IP-protection system, for example IP54 per DIN/IEC-EN 60034-5, consisting of a stator and a rotor (1) enclosing the stator in an embodiment of the above-described type.

18 Claims, 5 Drawing Sheets

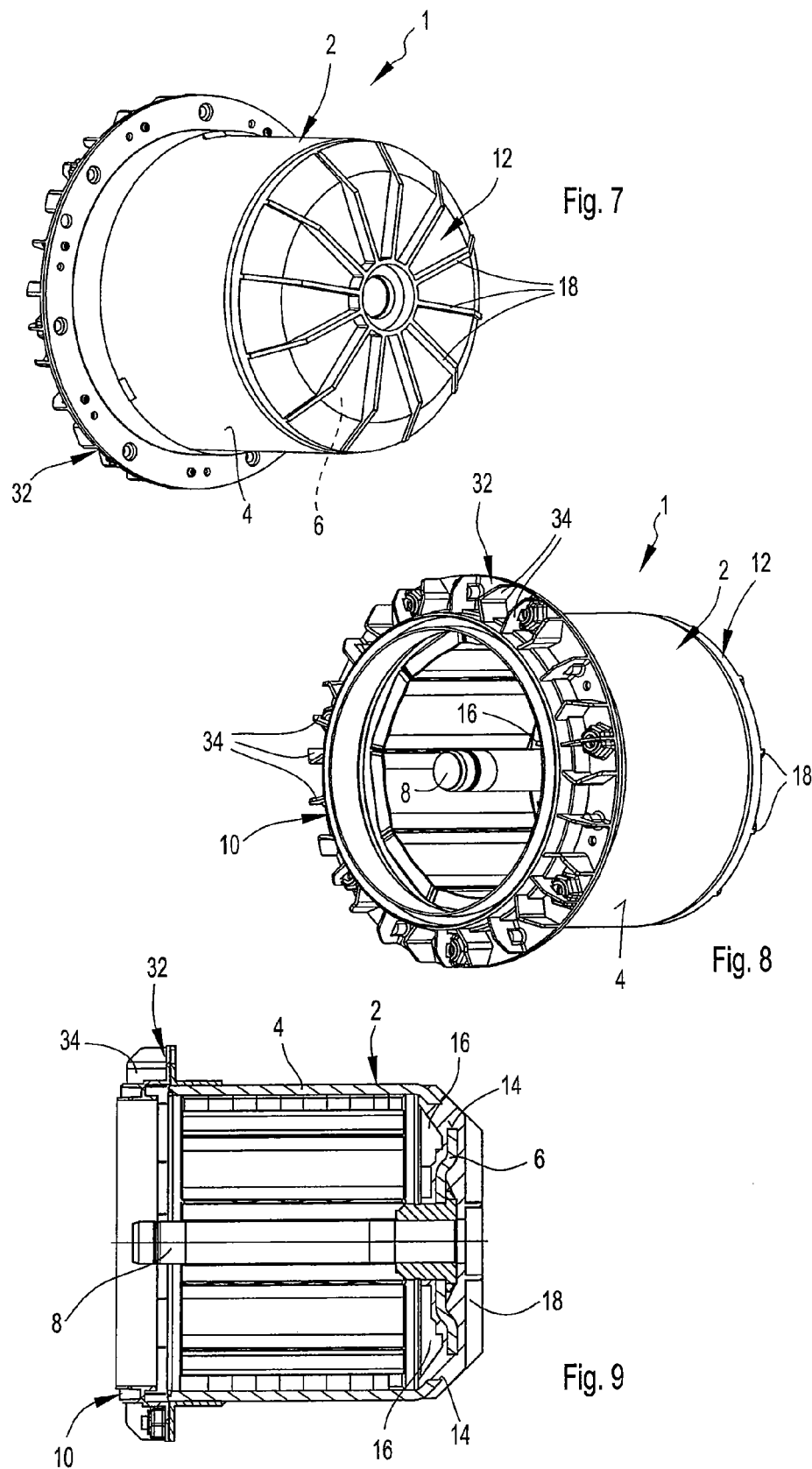

ROTOR FOR AN ELECTRIC EXTERNAL ROTOR MOTOR AND EXTERNAL ROTOR MOTOR

CROSS-REFERENCE TO RELATED APPLICATION

This application claims priority to European Patent Application No. 10175897.7, filed Sep. 9, 2010.

TECHNICAL FIELD OF THE INVENTION

The present invention relates to a rotor for an external rotor motor, comprising a rotor bell with a peripheral wall and at least one one-sided rotor base to encompass a stator, in particular as part of a motor housing with a high ingress protection rating (IP rating), as for example IP54 per DIN/IEC-EN 60034-5.

Further, the invention also relates to an electric external rotor motor comprising a stator and a rotor enclosing the stator.

BACKGROUND OF THE INVENTION

The document EP 1419568 B1 describes an electric motor with a high IP-rating in which a motor housing is formed partially from the pot-type rotor (external rotor). A slot between the rotating external rotor and the other, axially abutting part of the motor housing, which among other things holds the motor electronics and is stationary (non-rotating), is sealed off against the penetration of moisture or other foreign material from the outside by means of a suitable rotary seal, which in particular is configured as a labyrinth seal. This assures the desired high IP rating. Because of the virtually closed and/or encapsulated motor housing this produces, the problem arises that the power range is limited by the motor heat produced during operation. The indicated document therefore describes special means for internal cooling by internal air mixing in the internal region between the stator and rotor. Toward this end, the known motor features on the one hand, axially between the stator and an abutting electronics housing opposite the rotor, an internal fan wheel (cooling wheel) as well as, on the other hand, axially between the stator and the rotor base, a further cooling wheel. The effect of these cooling wheels rotating with the rotor is limited, however, because this only produces air circulation within the encapsulated internal space of the motor with the purpose of bringing heated air more intensively to specific mechanical parts, as for example a stator bushing and/or the rotor bell, by means of which the heat is then to be guided to the outside. This heat removal, to be sure, at least in the case of the rotor bell, is not especially effective, because the normally used material (drawn steel or plastic), possesses a heat conductivity of $\lambda < 100$ W/m·k.

SUMMARY OF THE INVENTION

It is the purpose of the present invention to improve an external rotor motor, and in particular its rotor, in such a way that it is suitable for an even higher power range due to more effective cooling.

According to the invention, this is achieved by a rotor with the inventive features described below.

The invention provides that the rotor bell in the region of the rotor base features a heat sink extending through the latter with high heat conductivity, in such a way that motor heat arising internally can be removed via the heat sink through the rotor base to the outside. This heat transport thus is largely through the heat sink, so that the cooling is largely independent of the material and the natural heat conductivity of the rotor bell.

The rotor bell itself consists, at least in the region of the rotor base, of a material with poor heat conductivity, which means that the heat conductivity in any case lies significantly below a value of 100 W/m·k. For example, the heat conductivity of steel, depending on the alloy, is between 10 and 60 W/m·k, for plastics even generally below 1 W/m·k. In contrast with this, the heat sink according to the invention consists of a material with a high heat conductivity, which in any case is greater than 100 W/m·k, in particular greater than 150 W/m·k. When aluminum is used, the heat conductivity $\lambda$, depending on the alloy, is in the region of 150 to 240 W/m·k.

In a preferred embodiment, the heat sink extends through openings in the rotor base, whereby on one side it features internal cooling blades, projecting from the rotor base inward into the rotor bell, and on other side external cooling ribs extending outward. Hereby the heat sink expediently consists of aluminum or some other suitable alternative material with the correspondingly high heat conductivity over 100 W/m·k, in particular over 150 W/m·k. The internal cooling blades, which extend into the internal space of the motor close to the stator, provide both for an intensive air circulation, and for an effective heat removal owing to the appropriately large surface area, which acts as a heat absorption surface. Within the entire heat sink, during operation there is a temperature gradient, whereby the heat is guided through the heat sink from the inside to the outside, and there is released to the ambient air. The cooling ribs on the outside likewise enlarge the surface, which there acts as a heat emitting surface.

In a further preferred embodiment, the openings of the rotor base necessary for heat removal from the inside to the outside are sealed on the outside by the heat sink, so that, despite the significantly improved cooling/heat removal, a high IP rating can be assured.

Below the invention is described in more detail with reference to the drawing and the therein illustrated special examples and design variations.

BRIEF DESCRIPTION OF THE DRAWINGS

FIG. 7-9 are views of a further, third alternative of the rotor, namely

FIG. 7 shows a perspective view oblique to the closed rotor side;

FIG. 8 shows a perspective view toward the opposite open rotor side; and

FIG. 9 shows an axial view of the rotor according to FIGS. 7 and 8.

DETAILED DESCRIPTION OF THE INVENTION

Figure 1:
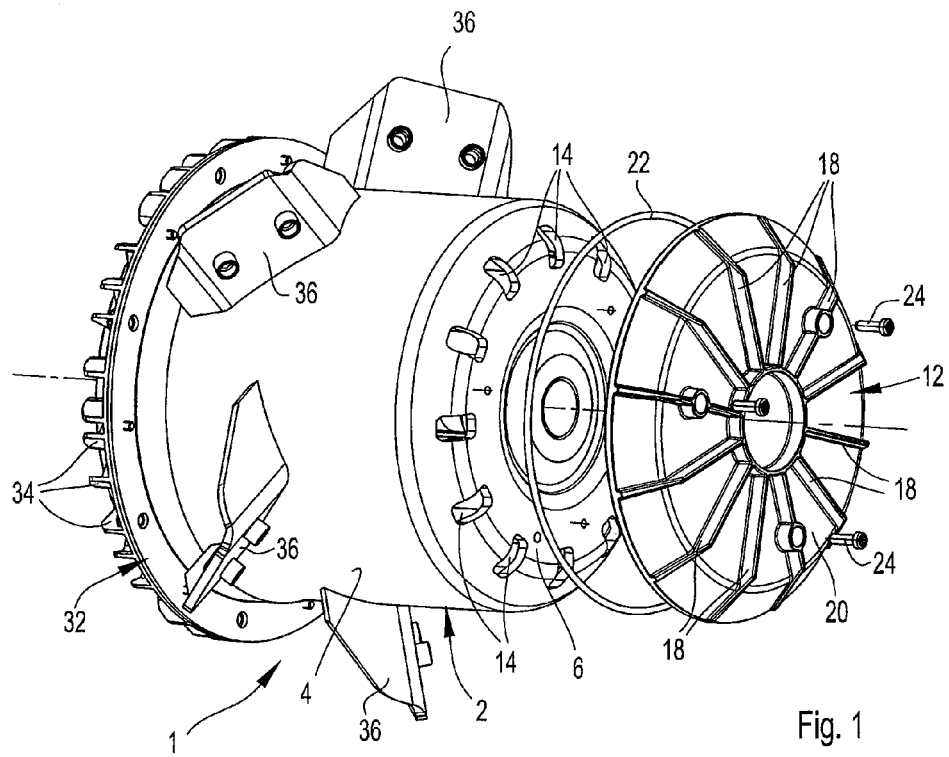
FIG. 1 is a perspective, exploded view of a first embodiment of a rotor according to the invention, one with the viewing direction oblique to the closed rotor side

In the various figures of the drawing, the same parts are marked with the same reference numbers. Therefore, each part is described only once, whereby the description applies analogously to the other drawing figures in which this part likewise may be identified with the corresponding reference numerals.

In the drawings, only one rotor 1 according to the invention of an electric external rotor motor is shown, consisting of a pot-type rotor bell 2 with a peripheral wall 4 and a one-sided, closed rotor base 6. The rotor (external rotor) in the electric external rotor motor encompasses in the normal fashion a stator, not shown, on one side as part of a motor housing. Here the rotor 1 is rotatably supported by means of a rotor shaft 8 inside the stator.

A peripheral slot formed between the rotating rotor 1 and the abutting remaining motor housing is sealed off by means of a suitable rotary seal 10, in particular configured as a labyrinth seal, against the penetration of moisture or other foreign materials from the outside. In this way the motor has a high IP rating according to IEC 60034-5, for example IP54.

Because of the closed and encapsulated embodiment of the motor housing, and because the rotor bell consists of a material with a poor heat conductivity $\lambda<100$ W/m·k, in particular of drawn steel and/or plastic, means to remove internal heat to the outside are provided. According to the invention, the rotor bell 2 features a heat sink 12, arranged in the region of the rotor base 6, with a high heat conductivity $\lambda>100$ W/m·k, in particular $\lambda>150$ W/m·k, in such a way that motor heat arising on the inside can be removed via the heat sink 12 through the rotor base 6 to the outside and into the environment.

In a preferred embodiment, in addition the heat sink 12 passes through the openings 14 of the rotor base 6, whereby the heat sink 12 features on one side internal cooling blades 16 projecting from the region of the rotor base 6 to the inside into the rotor bell 2, as well as, on the other side, external cooling ribs 18 projecting to the outside. The internal cooling blades 16 can be configured, as shown, axially projecting with a radial progression, but can also feature a profile like a fan blade. In addition, the external cooling ribs 18 are preferably radially aligned and project axially from the heat sink 12. The configuration and arrangement of the internal cooling blades 16 and the external cooling ribs 18 are basically optional, however.

Figure 2:
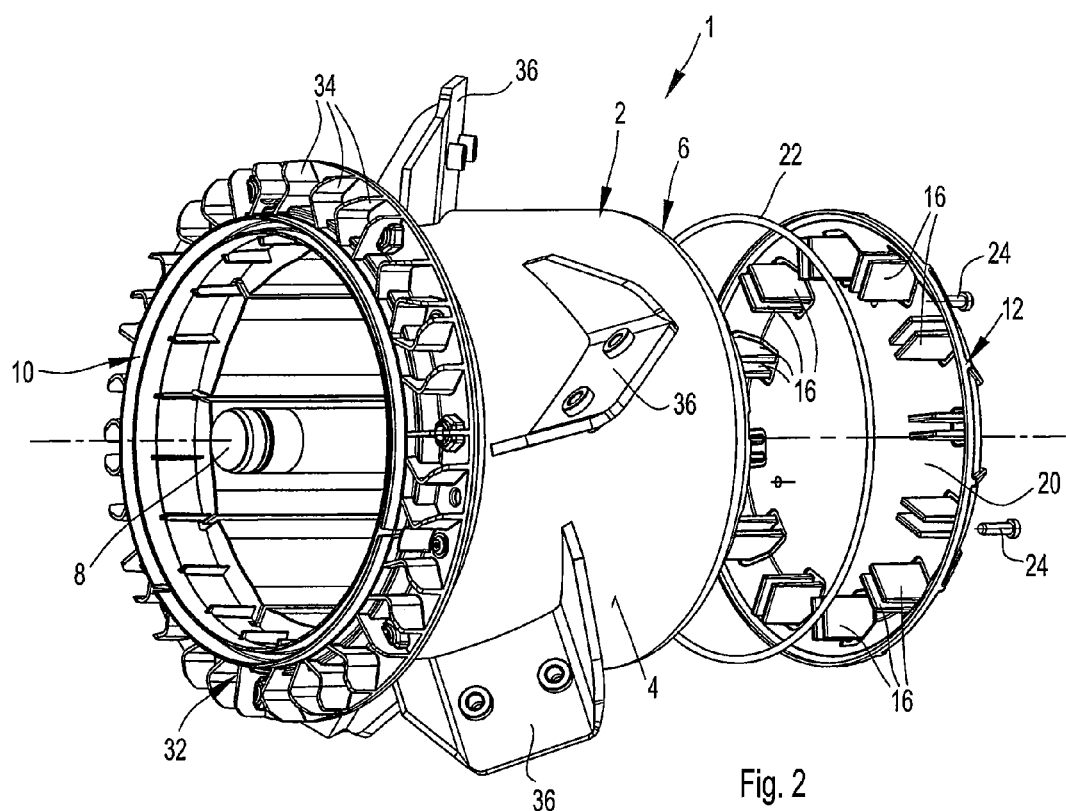
FIG. 2 is a view similar to FIG. 1, but with the viewing direction toward the opposite open rotor side
Figure 3:
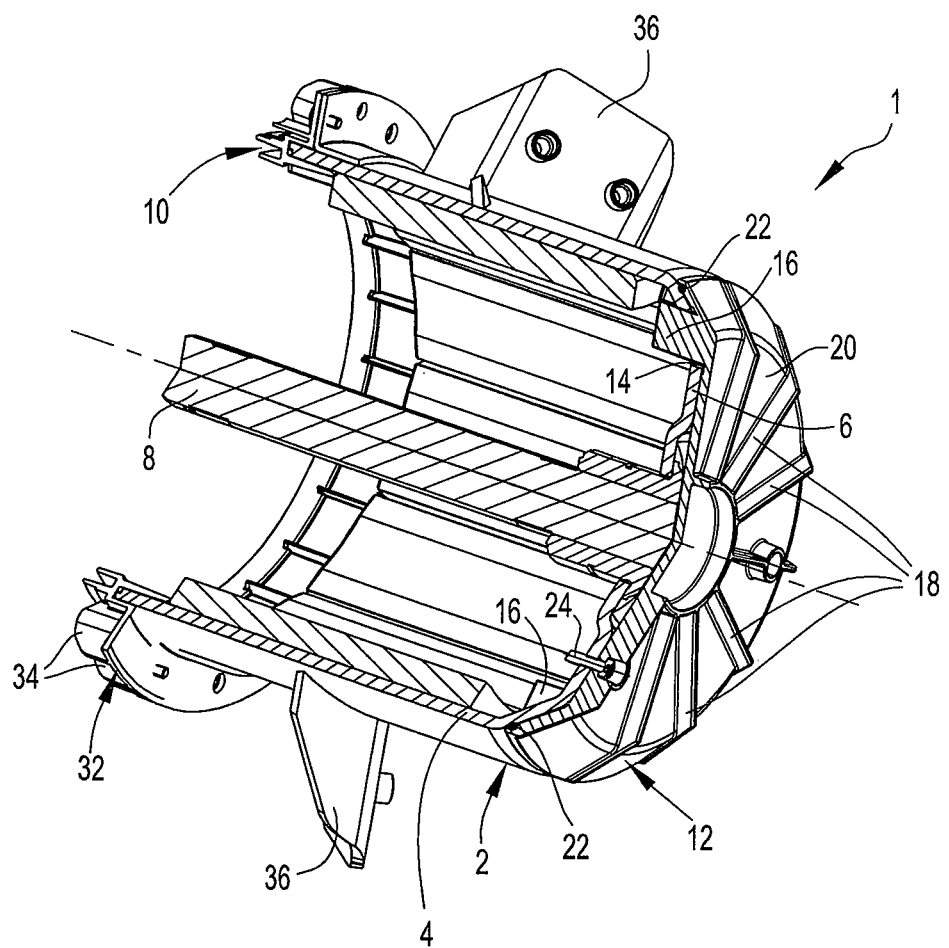
FIG. 3 is a sliced perspective view of the mounted rotor according to FIGS. 1 and 2.

As regards the first embodiment according to FIGS. 1 to 3, here the heat sink is configured as a separate, individual part, namely as a single-piece, disk-like cooling element 20. This single-section cooling element 20 features on one the cooling blades 16 and on the other the cooling ribs 18. Here the cooling element 20 is secured to the rotor base like a cap, whereby the cooling blades 16 extend though the openings 14 of the rotor base 6 into the internal space of the rotor bell 2. Toward this end, the cooling blades 16 are configured according to the size and arrangement of the openings 14 and arranged in groups such that they can be guided in a specific peripheral alignment of the cooling element 20 precisely through the openings 14. According to FIG. 2, for example, in each case two cooling blades 16 form a group, which are to be guided jointly through the same opening 14. Naturally the openings 14 can also be configured to be larger, so that a larger number of cooling blades 16 can be associated as a group with one of the openings 14. It is essential that the cooling element 20, when mounted, closes the openings 14 of the rotor base 6 to the outside. Preferably in the presented example, between the rotor base 6 and the cooling element 20, a seal is arranged that jointly encompasses the region of the openings 14. Alternatively, however, individual seals can also be provided for each individual cooling opening 14.

The fastening of the cooling element 12 to the rotor 1 and/or to the rotor bell 2 can preferably be by means screw connections, in that the screws 24 are screwed through the installation holes of the cooling element 20 into the threaded holes of the rotor base 6. Here reference is made especially to FIG. 3.

Figure 4:
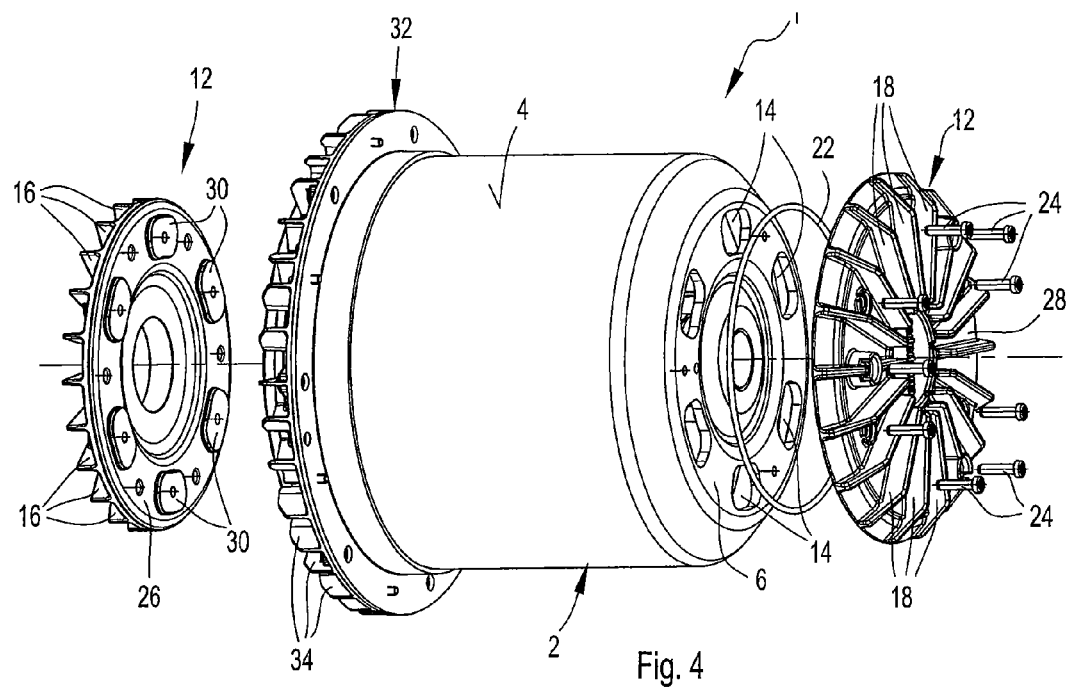
FIGS. 4-6 are views analogous to FIGS. 1 to 3 of an alternative, second embodiment of the invention.
Figure 5:
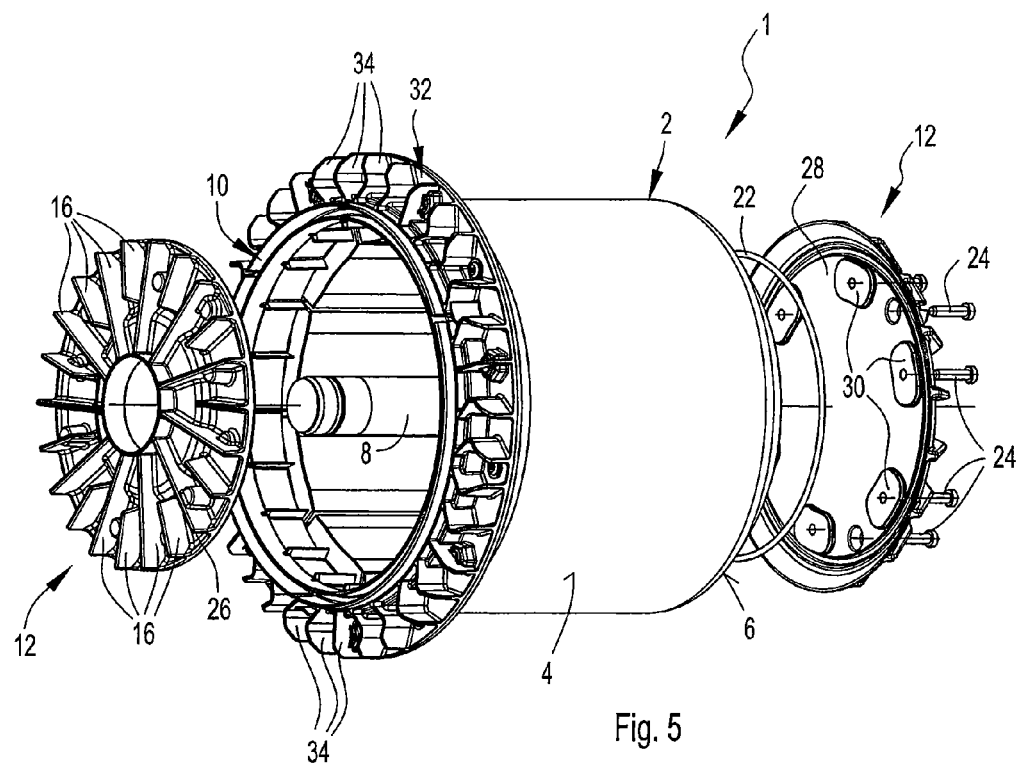
Figure 6:
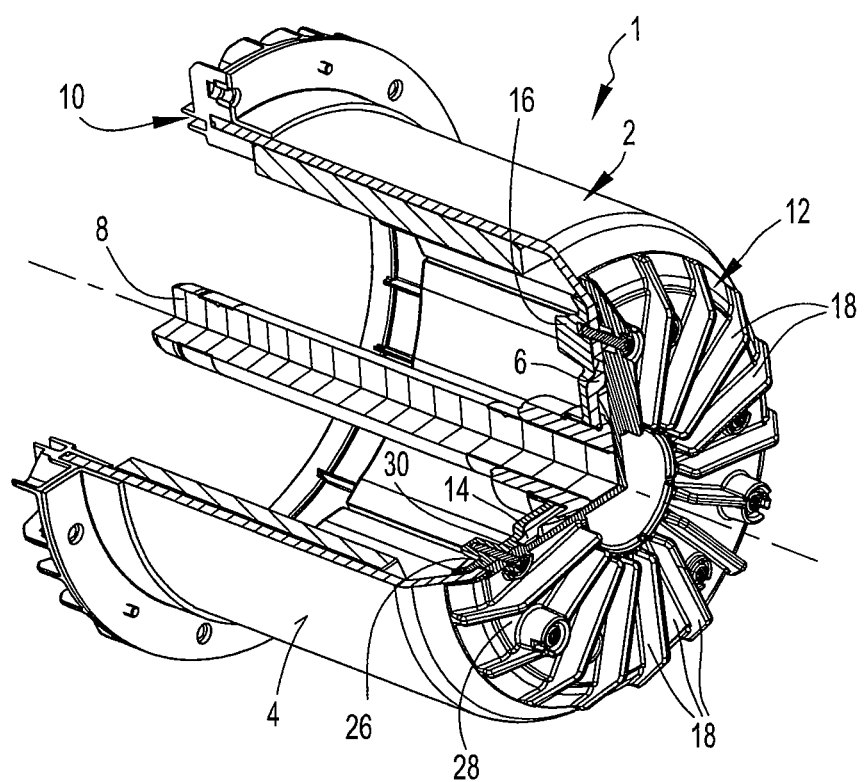

In the second embodiment, according to FIGS. 4 to 6, the heat sink 12 is configured in two parts from two separate and individual parts, namely from a disk-like internal cooling element 26 featuring the cooling blades 16 on both sides, and a disk-like external cooling element 28 featuring cooling ribs 18 on the outside. The internal cooling element 26 is inserted in the rotor bell 2 and secured on the inside of the rotor base 6. The external cooling element 28, analogously to the single-piece cooling element 20 according to FIGS. 1 to 3, is secured on the outside to the rotor base 6. Here the two cooling elements 26, 28, in the region of the openings 14 of the rotor base 6, are coupled to one another in heat-conducting fashion via the heat contact regions 30. The heat contact regions 30 extend into the openings 14 so that the heat sink 12 generally extends in heat-conducting manner through the openings 14. In this regard, in particular reference is made to the section in FIG. 6. To assure good heat transfer in each case the heat contact regions 30 have surfaces that are as large as possible, which therefore abut one another over a large surface. The openings 14 are configured with the accordingly adjusted dimensions.

Also in this second embodiment according to FIGS. 4 to 6, a corresponding seal of openings 14 on the outside is provided, toward which end here between the rotor base 6 and the external cooling element 28, a corresponding seal 22 is arranged. For installation and/or securing, the external cooling element 28 and the internal cooling element 26 are secured, in particular screwed, to one another by the sandwich-like intermediate layer of the rotor base 6. For this purpose the corresponding screws 24 are arranged in particular in the region of the heat contact regions, so as to achieve the most secure, readily heat-conducting arrangement when screwed in. Preferably, in addition screw attachments can also be provided in the intermediate peripheral regions.

Finally, as regards the third embodiment according to FIGS. 7 to 9, here the heat sink 12 is sharpened in the region of the rotor base 6, with penetration of the openings 14, whereby the inside cooling blades 16 and the outside the cooling ribs 18 are formed by molding. Here the heat sink 12 is bonded and/or interlocked with the rotor bell 2 and/or the rotor base 6. In this regard, reference is made primarily to the section in FIG. 9. The heat sink 12, formed advantageously from aluminum die casting, for example, closes the openings 14 of the rotor base 6 by means of interpenetration of material, so that IP encapsulation can be assured even without additional seal(s).

For all the embodiment forms, it can be provided in a further advantageous embodiment that the rotor bell 2 features a ring-like heat sink 32, with a spade-like cooling blade 34 distributed over the circumference, on its open side axially opposite the rotor base 6 and the heat sink 12. In this way, also in this region, heat removal to the outside is improved.

In addition to or alternatively to the heat sink 32, an internal fan wheel, not shown, in the sense of the above-mentioned EP 1419568 B1, can be arranged on an extended end of the rotor shaft 8 in such a way that this internal fan wheel can be rotatably arranged in a region axially disposed between the stator and the motor electronics.

Further, the rotor bell 2 can feature a rotor base on both sides, in an embodiment that likewise is not shown in the drawing, for example as shown in DE 29612395 U1. Here optionally only one or each of the two rotor bases can feature a heat sink 32 in one of the above embodiments. The bilaterally closed rotor bell then features no co-rotating rotor shaft, but is rotatably supported on or in a fixed axle.

For the sake of completeness, it should be noted that the rotor 1 according to the invention preferably is used as a fan drive. For this purpose, the rotor bell 2 features holder elements 36 secured to the peripheral wall 4 for the cooling blades, which are not shown. These are shown, however, only in FIGS. 1 to 3.

For an embodiment that does not require special IP protection, the/each of the rotor bases can also feature additional openings for additional cooling.

Even when only the rotor 1 is shown in the drawings, the invention also relates to the entire electric external rotor motor, in particular with an encapsulated motor housing with a high IP rating, for example IP54, consisting of a stator, not shown, and the rotor 1 according to the invention, which encloses the stator for example from an axial side as part of the motor housing in a pot-like manner.

The foregoing description of various embodiments of the invention has been presented for purposes of illustration and description. It is not intended to be exhaustive or to limit the invention to the precise embodiments disclosed. Numerous modifications or variations are possible in light of the above teachings. Furthermore, characteristics of one embodiment may be combined with characteristics of another embodiment within the scope of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted according to the breadth to which they are fairly, legally, and equitably entitled.

What is claimed is:

1. A rotor for an electric external rotor motor, comprising:
at least one one-sided rotor base for encompassing a stator, the rotor base being part of a motor housing, and
a rotor bell with a peripheral wall, the rotor bell including a heat sink extending through the rotor base, the heat sink being configured to lead motor heat produced inside the motor housing via the heat sink through the rotor base to the outside of the housing, wherein the heat sink passes through openings of the rotor base, the heat sink having internal cooling blades projecting from the rotor base into the rotor bell on one side of the openings, and on the other side of the openings the heat sink having cooling ribs extending to the outside of the motor housing.

2. The rotor according to claim 1, further comprising that the rotor bell, at least near the rotor base, is made of a material with a low heat conductivity of $\lambda<100$ W/m·k.

3. The rotor according to claim 2, wherein the material with the low heat conductivity is plastic.

4. The rotor according to claim 1, further comprising that the heat sink has a heat conductivity of at least $\lambda=100$ W/m·k.

5. The rotor according to claim 4, wherein the heat sink has a heat conductivity of at least $\lambda=150$ W/m·k.

6. The rotor according to claim 5, further comprising that the heat sink is at least in part made of aluminum, with a heat conductivity in a range of 150 to 240 W/m·k.

7. The rotor according to claim 1, further comprising that the heat sink is configured as a one-piece, disk-like cooling element, which features on one axial side the cooling blades and on the other axial side the cooling ribs, and that it is secured in a cap-like manner to the rotor base.

8. The rotor according to claim 1, further comprising that the heat sink seals the openings of the rotor base and a seal in the vicinity of the openings is arranged between the rotor base and the external cooling element.

9. The rotor according to claim 1, further comprising that the heat sink is configured from an internal cooling element featuring the cooling blades on the inside and an external cooling element featuring the cooling ribs on the outside, the internal and external cooling elements being connected to one another in a heat-conducting manner in the vicinity of the openings of the rotor base via heat-contact regions.

10. The rotor according to claim 9, further comprising that the heat sink seals the openings of the rotor base and a seal in the vicinity of the openings is arranged between the rotor base and the external cooling element.

11. The rotor according to claim 9, further comprising that the external cooling element and the internal cooling element are securely connected to one another with the rotor base forming an intermediate layer.

12. The rotor according to claim 5, further comprising that the heat sink is die-cast in the region of the rotor base by penetrating the openings in the rotor base and that cooling blades and cooling ribs are formed by molding.

13. The rotor according to claim 12, further comprising that the heat sink is rigidly connected to at least one of the rotor bell and the rotor base.

14. The rotor according to claim 1, further comprising that the rotor bell has an open side opposite the rotor base and that the heat sink is ring-like, the open side bearing the ring-like heat sink with spade-like cooling blades distributed over the periphery of the heat sink.

15. The rotor according to claim 1, further comprising a motor shaft connected to the rotor bell via the rotor base, the motor shaft being rotatably supported via pivot bearings relative to a stator, the motor shaft being configured for securing an internal fan wheel to an extended shaft end in such a way that the internal fan wheel may be arranged inside the motor housing between the stator and motor electronics.

16. The rotor according to claim 15, further comprising that the rotor bell is supportable via the pivot bearings on a non-rotating axis.

17. The rotor according to claim 1, further comprising that the rotor bell having two rotor bases arranged on opposite sides of the rotor bell, at least one of the two rotor bases including the heat sink.

18. An electric external rotor motor with an encapsulated motor housing comprising a rotor according to claim 1.

* * * * *